Feb. 14, 1950     P. L. CHELLE     2,497,344
BOTTLE LABELER WITH NECK LABEL GAUGE
Filed Feb. 14, 1946     4 Sheets-Sheet 3
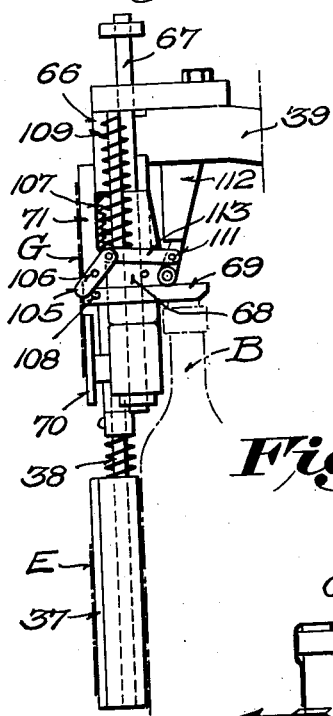
Fig. 5.
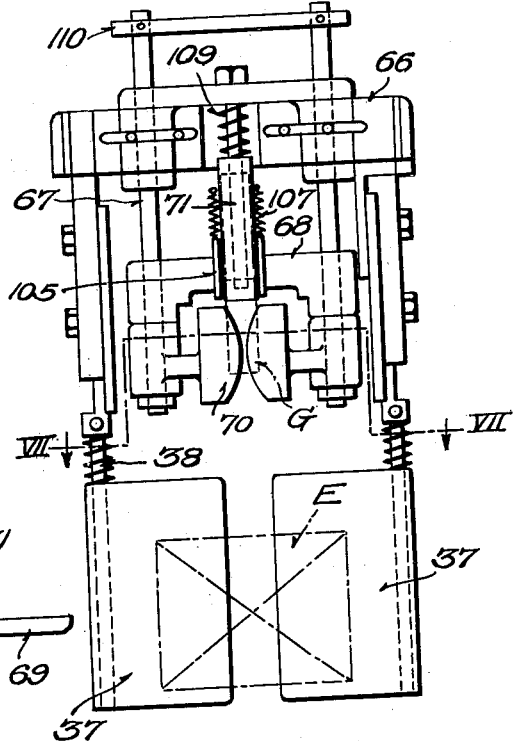
Fig. 6.
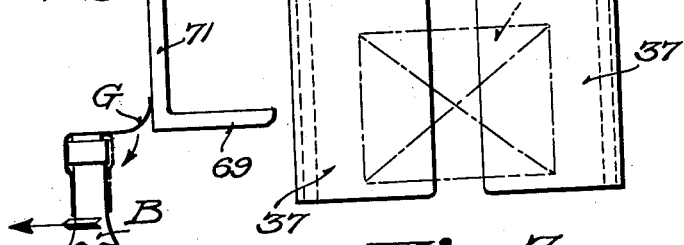
Fig. 9.
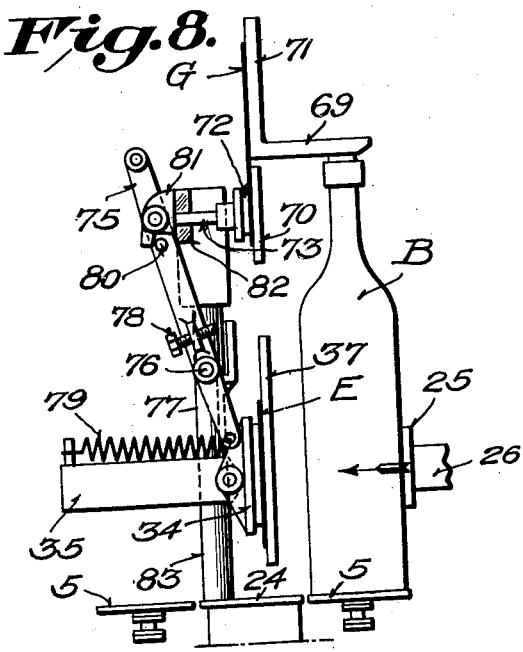
Fig. 8.
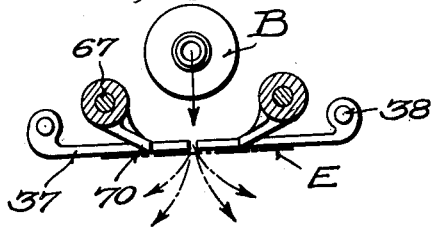
Fig. 7.
Inventor
Paul L. Chelle,
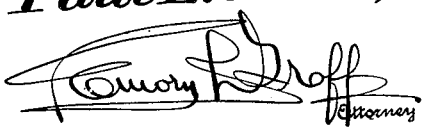
By    Attorney Feb. 14, 1950 P. L. CHELLE 2,497,344
BOTTLE LABELER WITH NECK LABEL GAUGE
Filed Feb. 14, 1946 4 Sheets-Sheet 4
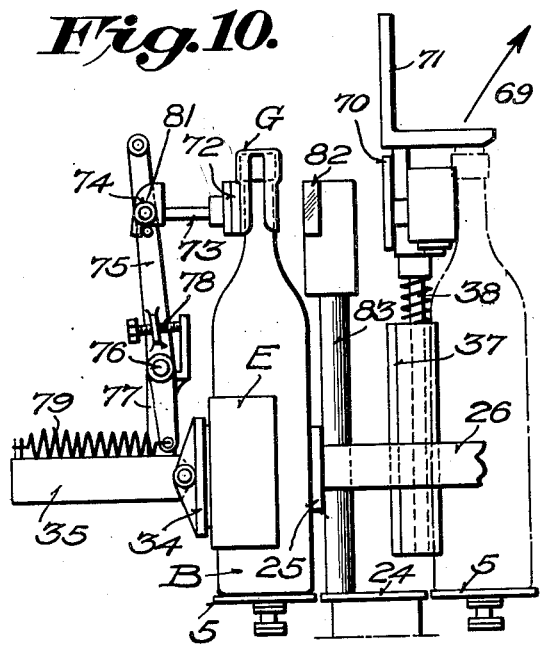
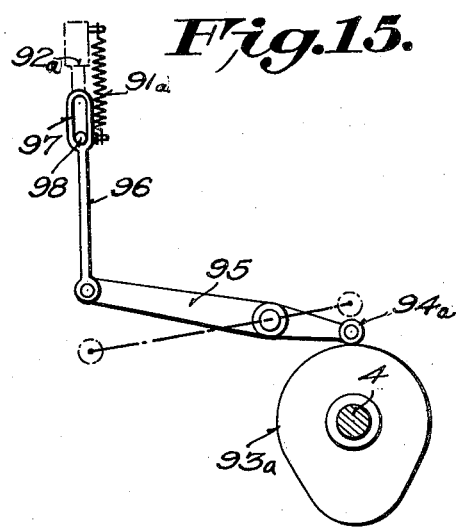
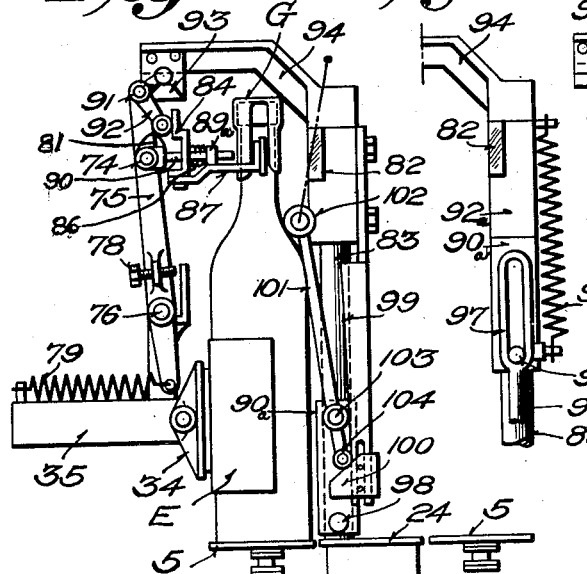
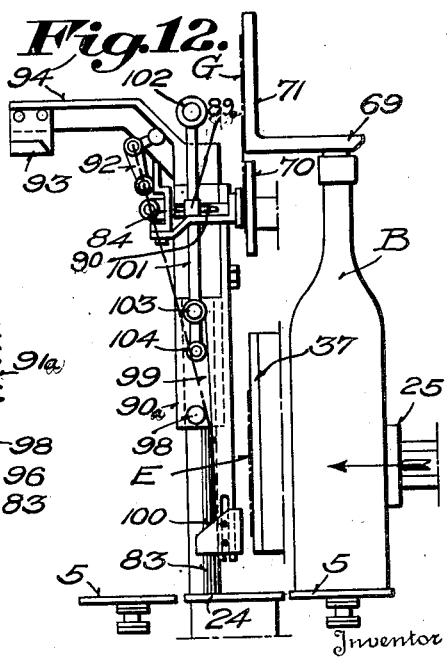
Inventor
Paul L. Chelle,
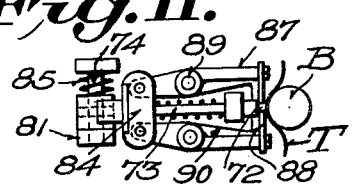
By
Attorney Patented Feb. 14, 1950

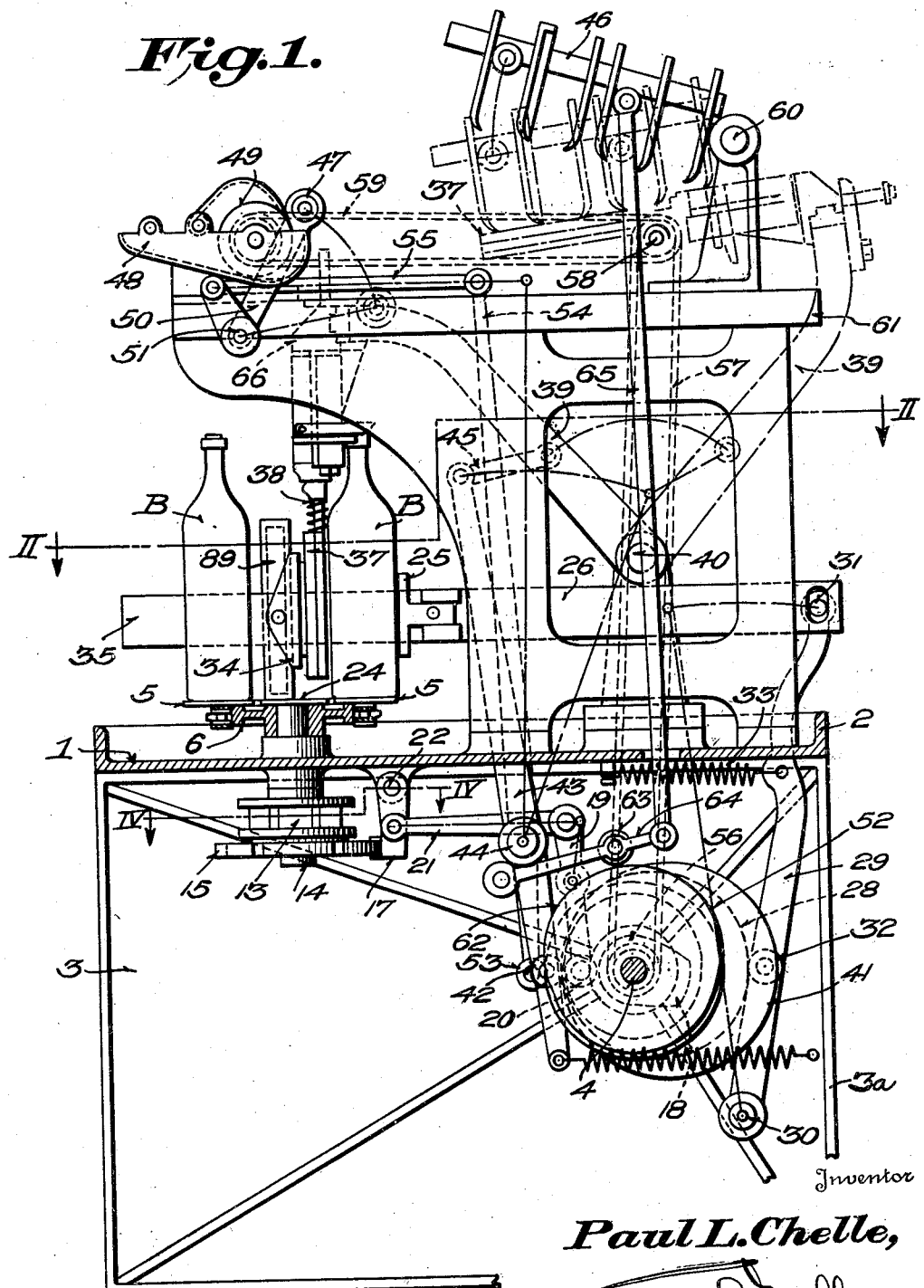

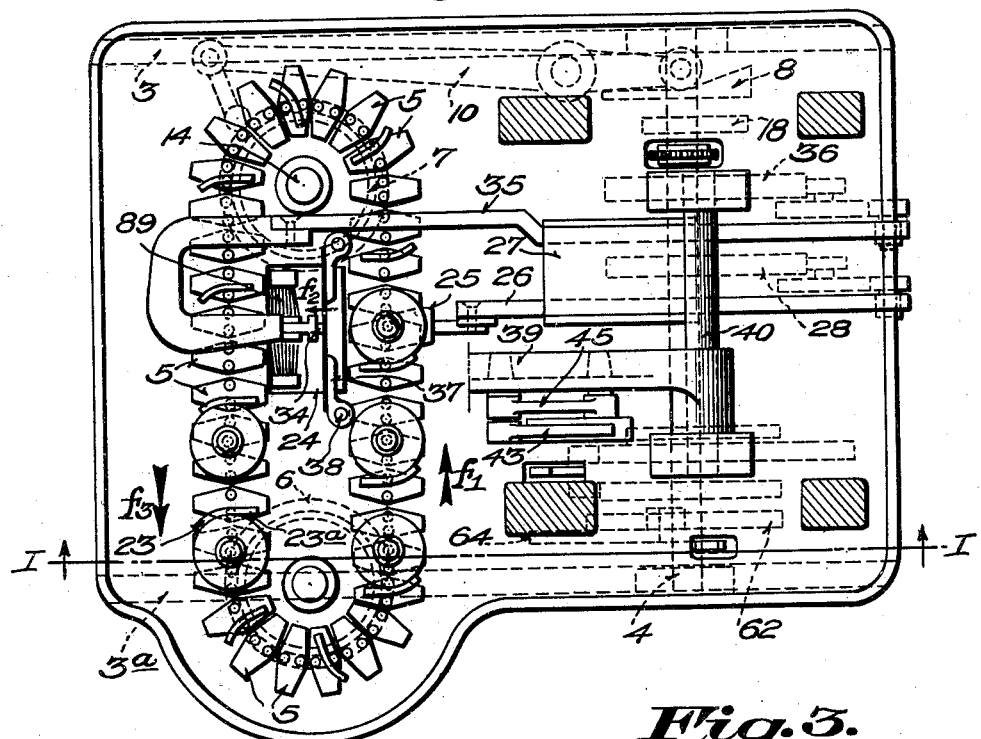
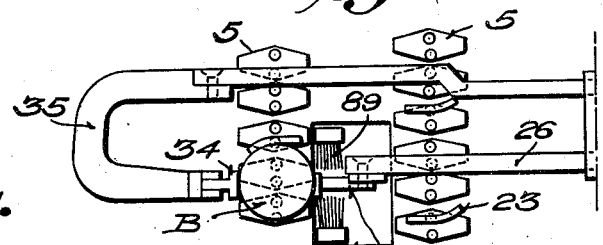
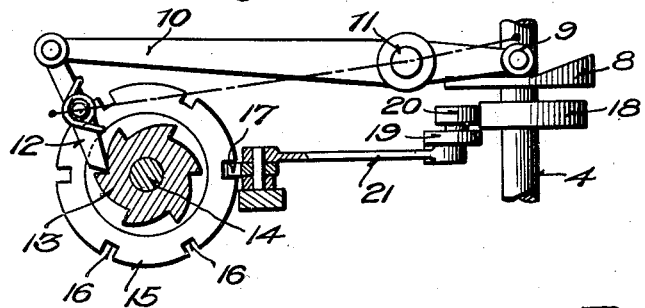

2,497,344

UNITED STATES PATENT OFFICE 2,497,344

BOTTLE LABELER WITH NECK LABEL GAUGE

Paul Louis Chelle, Paris, France

Application February 14, 1946, Serial No. 647,563
In France June 10, 1943

Section 1, Public Law 690, August 8, 1946
Patent expires June 10, 1963

6 Claims. (Cl. 216—13)

The present invention relates to a bottle labeller with neck label gauge, provided with an endless chain with plates for supporting bottles or other objects of similar form, for instance, of cylindrical form. Said chain which acts as conveyor, moves intermittently or by jerks and the two flights thereof, serving the one for feeding and the other for removal of the bottles, are situated parallel in one given horizontal plane a short distance apart. The main object of the invention is to provide, in a labeller of the character described, the labelling mechanism designed in a manner to label each bottle and during its passage from the feeding portion to the delivery portion of the conveyor, by means of a pusher adapted to laterally slide or push a bottle from one side to the other of the conveyor during intervals when said conveyor is at rest.

In order to permit this transverse passage from one flight to the other of the conveyor, another object of the invention is to provide, in a labeller of the character described, holding back pieces or shields, carried by the blades of the chain, having an unsymmetrical form, similar to an inverted J, the branch of which is oriented towards the interior of the endless chain being straight and perpendicular to this chain.

Another object of the invention is to provide, in a labeller of the character described, an auxiliary labelling mechanism acting in synchronism with the principal labelling mechanism and permitting to apply to the neck of the bottle a stamp or a guarantee band bestriding the neck of the bottle, this auxiliary mechanism being driven in a manner to correctly apply the stamp or the band, whatever the height of the bottles. For this purpose, the gummers for pasting the small label are carried by a sliding device which is placed, through the action of a feeler member, at a fixed vertical distance from the end of the neck of the bottle.

The following description taken with the accompanying drawings shows a non-limiting example, and will make apparent how the invention is to be performed.

In the drawings:

Figure 1 represents the assembly of the machine taken in vertical section taken on the line I—I of Figure 2.

Figure 2 is a horizontal section taken on the line II—II of Figure 1.

Figure 3 shows in plan the pusher plate at the end of the operation of labelling of a bottle.

Figure 4 shows a section on the line IV—IV of Figure 1, illustrating the mechanism causing motion and locking of the conveyor.

Figures 5 and 6 show in profile and in elevation the gummers for pasting.

Figure 7 is a section taken on the line VII—VII of Figure 6.

Figure 8 shows in profile the position of the gummers and of the holding member of the labels at the beginning of the labelling cycle.

Figure 9 shows the applying of a bestriding label over the neck of the bottle.

Figure 10 is a view similar to Figure 8 but showing the end of the applying of the labels and omitting the slide, the spring thereof and the bracket.

Figure 11 shows in plan the mechanism for rolling the label around the neck of the bottle.

Figures 12 and 13 show in profile the device for smoothing a label bestriding the neck, respectively at the beginning and at the end of the applying of said label.

Figure 14 shows a detail of Figure 12.

Figure 15 shows the control mechanism of the smoothing device illustrated in Figures 12-14.

Referring to the drawings in detail, as will be seen in Figures 1 and 2, the assembly of the various mechanisms of the machine and of their control members is carried on a table 1 provided with a shallow margin 2 and resting on two vertical supports 3, 3a. Within these supports are positioned the bearings of a cam shaft 4 which is driven by an electric motor, not shown, through a belt and a speed reducer. All the movements of the machine without exception are controlled from this cam shaft 4.

Above the upper part of the table 1 there moves a conveyor positioned in a horizontal plane and consisting of a chain on the links of which are fixed hexagonal blades 5, permitting the chain to adapt itself to the curvature of horizontal sprocket wheels 6, 7, of which the second serves to drive the chain with an intermittent movement. This intermittent motion is obtained by means of a cam 8 carried by the shaft 4 with which cooperates a runner 9 (Figs. 2 and 4) terminally carried on a lever 10 which pivots about a vertical fixed spindle 11 and the other end of which carries a pawl 12 acting on a ratchet wheel 13 rigid with the vertical shaft 14 of the sprocket wheel 7. On the same shaft 14 is carried a locking plate 15 provided with notches 16 for being engaged by a latch 17 pivoted at 22 and controlled and actuated by the cam 18 keyed on the shaft 4, through a rod system comprising a lever 19 with runner 20 and a rod 21. The cams 8 and 18 are so shaped that the locking plate 15 will be locked during the intervals of time when the pawl 12 is inactive, and conversely, that the plate should be free to move during the other intervals to permit the pawl 12 to produce the intermittent advance of the conveyor.

The bottles to be labelled pass in file in the direction of the arrow $f^1$ along the inner flight of the conveyor; the labelling operation occurs during the passage of a bottle transversely from the interior flight or feeding flight to the exterior flight or removal flight as shown by arrow $f^2$ (Fig. 2), then the bottles are removed on this removal flight in the direction of the arrow $f^3$ (Fig. 2). On the conveyor the bottles are held in a manner known per se by shields 23 which are provided on every third blade 5, for example. However, the symmetrical form of the known shields would not permit the transverse sliding movement of the bottles shown at $f^2$ perpendicularly to the two flights of the conveyor. According to the present invention, this effect is obtained by giving the shields 23 an unsymmetrical form, similar to that of an inverted J, the branch 23a of which is turned in either flight of the conveyor toward the other flight of the chain, being straight and perpendicular to the directions of displacement shown at $f^1$ and $f^3$.

The transverse translation movement shown at $f^2$ during which the bottle slides on the blade 5 of the conveyor and on a fixed plate 24, is produced by pusher plate or ejector 25 fixed to a horizontal sliding plate 26 which is guided by a fixed slide 27.

The reciprocating movement of the sliding plate 26 is produced by a cam 28, through a lever 29 which pivots about a fixed horizontal shaft 30 and which is hinged by means of a stud 31 sliding in a slot provided at the back end of the sliding plate 26; the lever 29 carries a runner 32 which is applied constantly against the cam 28 by a spring 33.

During its transverse translation movement shown at $f^2$, the bottle pushed on one side by ejector 25 is held from the other side by a retaining member 34 fixed at the end of a bent sliding plate 35 which is guided in the slide 27. This bent sliding plate 35 is controlled by cam 36 and a similar rod system to that of the sliding plate 26.

The gummers 37 for pasting of the main body-label E are pivotally mounted on parallel shafts 38, 38 (Fig. 6) carried by a support 66 mounted on the end of an arm 39 which swings about a fixed horizontal shaft 40 under the action of a cam 41 on a runner 42, through a lever 43 pivoted at 44 and a small rod 45. In one of the extreme swinging positions of arm 39 (represented by full lines in Fig. 1) the gummers 37 are in a vertical plane between the fixed brushes 89 acting for smoothing the main body-label on the bottle which is being labelled, between the two flights of the conveyor; in the other extreme position (shown by dotted lines in Fig. 1) the gummers are lifted against the box-like label holder 46.

During their upward stroke, the gummers 37 receive paste while passing in contact with the applying roller 47 of a conventional pasting device which comprises a stationary paste container 48, mounted on a platform 61 of the frame, a paste transfer roller 49 and a lever 50 carrying the applying roller 47, and the movement of which around a fixed horizontal shaft 51 is produced by cam 52 through a runner 53, a lever 54, and a rod 55. The paste transfer roller rotates continuously by means of a sprocket wheel 56 keyed on the cam shaft 4, controlling an endless chain 57, which engages a sprocket wheel 58 controlling an endless chain 59.

The box-like label holder 46 pivots about a fixed horizontal axis 60 carried by a bracket supported by the platform 61. The movement of this holder 56 is produced by a cam 62 through a runner 63, a lever 64 and a rod 65.

Besides the applying of the main body label, the machine is provided with means for applying a neck label or a guarantee band bestriding the neck. For this purpose, the support 66 comprises two slides wherein can slide two sliding rods 67, 67, which are parallel to the shaft 38 and are carried in a cross member 68. This latter carries a bulging stop 69 acting as feeler and which, when abutting against the neck of the bottle to be labelled, adjusts with relation to this neck the position of the auxiliary gummers. Said auxiliary gummers comprise two gummers 70 (Fig. 5) which can pivot about the lower end of the rod 67, and a central upper gummer 71 which is fixedly carried by the cross member 68. The gummers 70 act to apply a stamp or the first branch of a bestriding label on the side of the neck of the bottle, the gummer 71 acting to apply the second branch of said bestriding label over said neck on the other side thereof. The pasting surfaces of the gummers 37, 70, 71 are in the same given vertical plane, when the machine is at rest.

Just as the main body-label is held against the bottle by the retaining member 34, the stamp or the first part of the guarantee band is held against the neck of the bottle by a pusher plate 72 (Fig. 10) which is, prior to applying the labels to the bottle, in the same given vertical plane as the retaining member 34, in front of the gummer 70 (Fig. 8) but which is then elastically applied against the neck of the bottle by shifting with reference to the retaining member 34, taking account of the profile of the bottle (Fig. 10). For this purpose the pusher plate 72 is fixed to the end of a rod 73 pivoted on a shaft 74, by a carrying member 81, to a lever 75 which pivots at 76 on a support 77 which is integral with the bent sliding plate 35. A spring 79 constantly tends to apply the lever 75 against an adjustable abutment 78, and a spring 85 which is wound around the articulation shaft 74 constantly tends to apply a nose of the carrying member 81 against an abutment 80. In the position of Figure 8, this carrying member 81 is held by a fixed abutment 82 integral with a pillar 83; the meeting of the carrying member 81 and the abutment 82 requires the lever 75 to swing against the action of spring 79, to maintain the pusher plate 72 against gummers 70.

Figures 11 to 13 show the device for smoothing the stamp. It comprises a sliding member 84 which is movable along the length of rod 73 and which is constantly urged by a spring 86 towards the carrying member 81 (Fig. 11). To this sliding member there are symmetrically joined two small levers 87, acting as pincers, each one terminated by a rubber wiper 88 and each one carrying a runner 89a which cooperates with a ramp 90 and is integral with carrying member 81. To the upper end 91 of the lever 75 is joined a knee lever 92, one arm of which cooperates with a fixed ramp 93 which is integral with a bracket 84 of the pillar 83 and the other arm of which acts on the sliding member 84.

Figure 13 shows that at the end of the labelling operation, the bent sliding plate 35 being pushed back by the bottle B, the ramp 93 swings the knee lever 92 which pushes back the sliding member 84 against the action of spring 86, and causes the pincers acting levers 87 to open through the action of ramps 90, so that the neck of the bottle B passes between the wipers 88 which thus smoothes the stamp T around the neck of the bottle.

When it is necessary to apply the guarantee band G bestriding the neck of the bottle, the guarantee band is distributed by the box-like label holder at the same time on the gummer 71 and on the pivoting gummers 70 (Figs. 6 and 8). The neck of the bottle B (Fig. 8) first takes up from the gummers 70 the first branch of the guarantee band which is then held by the pusher plate 72 while the rest of the guarantee band G slides along the length of the gummer 71 (Fig. 9) to then fall back on the neck of the bottle by virtue of its own weight (Fig. 10). At this moment there comes into play a smoothing arrangement actuated in the following manner.

Along the length of the pillar 83 a slider 90a can slide which is constantly urged by a spring 91a upwards against a fixed abutment 92a (Fig. 14). This slider is controlled (Fig. 15) by a cam 93a through the means of a rod 94a, a lever 95 and a rod 96 engaged by a slot 97 with a stud 98 of the slider 90a. To the fixed abutment 92a there is attached a ramp 99 which itself carries at its lower end an inverted ramp 100, fixed in adjustable manner. A lever 101 terminated by a smoothing roller 102 is pivoted on horizontal shaft 103 carried by slider 90a, its lower end carries roller 104 which cooperates with ramps 99 and 100. In the position shown in Figure 12 (prior to labelling), the slider 90a is lifted by spring 91a and the lever 101 is raised by ramp 99. At the end of the labelling operation (Fig. 13), the cam 93a lowers the slider 90 and the ramp 99 permits the roller 102 to be applied against the neck of the bottle of which it follows the profile; after this operation the ramp 100 again raises the lever 101 to permit the disengagement of the bottle and its removal by the conveyor.

In order to maintain the band G straight while it slides on the gummer 71 (Fig. 9), there are provided on the cross member 69, on either side of this gummer, two retractable guiding fingers 105 pivoted around shafts 106 and which are constantly urged by springs 107 to be retracted with relation to the pasting surface of gummer 71, by applying them against the abutments 108. When the feeler member 69 is not applied against a bottle, and particularly when lever 39 moves upwards towards the box-like label holder 46, the cross member 68 is pushed back against the gummer 37 by a spring 109, until the upper cross member 110, which connects together the sliding rods 67, comes into engagement against the support 66. The spring 107 acts to produce the retraction of finger 105. On the contrary, when the feeler member 69 is positioned against a bottle B (Fig. 5), a lever 111 pivoted on the cross member 68 engages an abutment 112 provided on the arm 39 and, through the action of a small rod 113 which couples the fingers 105 to the lever 111, it causes the fingers 105 to pivot in such a manner as to project them out on the pasting surface of the gummer 71, in order to hold the band G.

The operation of the machine thus constituted will be clearly apparent from the preceding description. It will be seen that the stamp T or the guarantee band G is always, through the automatic adjusting effect with the aid of feeler member 69, positioned at a fixed determined distance from the end of the neck of the bottles, whatever may be the individual differences in height of the bottles.

I claim:

1. In a bottle labeller, a pair of drive wheels, a pair of vertical pivot means for mounting said wheels respectively, an endless chain passing around said wheels and being positioned with its two flights in substantially the same horizontal plane, intermittent drive means for intermittently driving one of said wheels and said chain, a plurality of bottle engaging means carried by said chain, pushing means for releasing bottles carried by a first one of said flights from said flight and pushing the same through a labelling position located between the two flights of said chain to engagement with the second one of said flights, means for actuating said pushing means during the interval when said chain is immobile under said intermittent drive, principal labelling means adapted to apply a main body-label to the body of the bottle when said bottle is located in said labelling position between the two flights of said chain, means for operating said principal labelling means and means for controlling said intermittent drive means, said actuating means and said operating means strictly sequentially in timed order.

2. A bottle labeller according to claim 1, said bottle engaging means comprising unsymmetrical shields, similar to an inverted J, having their legs on the inside of said chain substantially perpendicular thereto.

3. A labelling machine according to claim 1 and auxiliary labelling means positioned to apply a neck label to the neck of a bottle while said bottle is being translated between said flights by said pushing means and comprising auxiliary gummers, and positioning feeler means engageable with the neck of a bottle and adapted to position said auxiliary gummers according to the height and contour of a bottle to be neck labeled.

4. A labelling machine according to claim 1, and auxiliary labelling means positioned to apply a neck label to the neck of a bottle while said bottle is being translated between said flights by said pushing means and comprising auxiliary gummers, and positioning feeler means engageable with the neck of a bottle and adapted to position said auxiliary gummers according to the height and contour of the neck of a bottle to be neck labelled, said auxiliary gummers of said auxiliary labelling means being actuated by the actuating means of said principal labelling means.

5. A labelling machine according to claim 1, and auxiliary labelling means positioned to apply a neck label to the neck of a bottle while said bottle is being translated between said flights by said pushing means and comprising auxiliary gummers, and positioning feeler means engageable with the neck of a bottle and adapted to position said auxiliary gummers according to the height and contour of the neck of a bottle to be neck labeled, said auxiliary labelling means comprising resilient pincers, adapted to apply said neck label to the neck of a bottle, and means driven by said drive means for separating the arms of said pincers after said neck label has been applied to the neck of a bottle.

6. A bottle labeller according to claim 1, and auxiliary labelling means positioned to apply a neck label provided with two branches for bestriding the neck of a bottle while said bottle is being translated between said flights by said pushing means and comprising main auxiliary gummers actuated by the operating means of said principal labelling means for applying one branch of said neck label on one side of the neck of a bottle, positioning feeler means engageable with said neck and adapted to position said main auxiliary gummers according to the height and contour of the neck of a bottle to be bestridingly neck labeled and a secondary auxiliary neck label gummer carried by said feeler means for applying the other branch of said neck label on the other side of said neck.

PAUL LOUIS CHELLE.

REFERENCES CITED

The following references are of record in the file of this patent:

UNITED STATES PATENTS

| Number | Name | Date |
| --- | --- | --- |
| 1,167,496 | Harders | Jan. 11, 1916 |
| 1,673,091 | Risser | June 12, 1928 |